USE OF CERTAIN METHYLPHOSPHONATE DIESTER COMPOUNDS AS INSECTICIDES

George M. Steinberg, Baltimore, and Claire N. Lieske, Joppa, Md., and Arthur B. Ash, Detroit, and Peter Blumbergs, Oak Park, Mich., assignors to Ash Stevens, Inc., Detroit, Mich.
No Drawing. Filed Feb. 16, 1970, Ser. No. 11,876
Int. Cl. A01n 9/36
U.S. Cl. 424—214                                3 Claims

ABSTRACT OF THE DISCLOSURE

Methylphosphonate diesters useful as insecticides are described. The ester groups include phenacyl and phenyl groups which are unsubstituted and substituted in the phenyl ring. The insecticidal activity of the compounds is destroyed by hydrolysis wherein the phenacyl group, either in keto or oxime form, activates the displacement of the phenyl group in the presence of water to produce the corresponding inactive hydrolysis products, phenacyl methylphosphonic acids and phenols. Insecticidal compositions incorporating the methylphosphonate diesters as the active ingredient are also described.

BACKGROUND OF THE INVENTION

The present invention relates to methylphosphonate diester insecticides which are self-destructive under hydrolytic conditions. In particular, the present invention provides insecticide compositions and methods of use wherein the active compound can be destroyed rapidly with water; the insecticidal activity is lost and the residues which form are relatively non-toxic.

The extensive prior art relating to toxic phosphorus esters is well covered in two important books. The first of these is "Toxic Phosphorus Esters" by R. D. O'Brien, published by Academic Press, New York and London (1969) and "Insecticides—Action and Metabolism" by R. D. O'Brien, Academic Press, New York and London (1967). The prior art has shown that many phosphonate compounds can be used to kill various organisms and that the degree of toxicity varies with the nature of the groups in the molecule. In general, although there are exceptions to the rule, toxicity in organophosphonates and organophosphates requires the presence of a readily displaceable group, known as a leaving group, which imparts reactivity to the molecule. These so-called leaving groups are generally selected from molecular configurations that form anions when they react with active groups or centers known as nucleophiles. Typical leaving groups include phenylate anions (substituted phenols), halide, cyanide, azido and various others. The presence of these groups also imparts toxicity to the molecules. Thus, the mechanism of the toxicification reaction is believed to involve reaction of the organophosphorus compounds with the active-site of critical enzymes of living organisms, a process in which the leaving group is essentially exchanged with active-site of the enzyme so that the enzyme can no longer fulfill its normal function. One of the vital enzymes which is so deactivated is acetylcholinesterase which is necessary to the function of the nervous system of most organisms. The common organophosphonates and organophosphates thus present a very substantial hazard both to insects and other pests, as well as to the user. Further, it may be shown that, in spite of the presence of a good leaving group in the molecule, the common insecticides of the organophosphonate and organophosphate variety react relatively slowly with water and persist in the environment long after their intended function has ended.

It is therefore an object of the present invention to provide insecticide compositions and their method of use containing phosphonate compounds which have a built-in mechanism for their destruction and inactivation. Further, it is an object of the present invention to provide such compositions and methods of use wherein the destruction of the methylphosphonate is accomplished under hydrolytic conditions easily encountered or provided in the environment.

These and other objects will become increasingly apparent by reference to the following description.

DESCRIPTION OF THE INVENTION

The present invention relates to the method for the control of insects which comprises: exposing the insects to an insecticidal amount of a methylphosphonate ester of the formula:

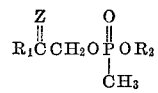

wherein $R_1$ and $R_2$ are substituted and unsubstituted phenyl groups wherein $R_2$ is a leaving group which is displaced in the presence of the $R_1$ acyl group under hydrolytic conditions thereby eliminating insecticidal activity and wherein Z is selected from oxy and oxime groups. Also the present invention relates to the composition which comprises: (a) a methyl phosphonate ester of the formula:

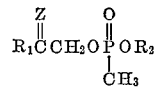

wherein $R_1$ and $R_2$ are substituted and unsubstituted phenyl groups wherein $R_2$ is a leaving group which is displaced in the presence of the $R_1$ acyl group under hydrolytic conditions thereby eliminating insecticidal activity and wherein Z is selected from oxy and oxime groups; and (b) a carrier material, wherein the composition contains an insecticidal amount of the ester.

The compounds specifically disclosed are listed in Table I, including their melting point, their half lives in minutes in water at pH 8.0 and 25° C. and their relative toxicities ($LD_{50}$) as determined intravenously in mice.

TABLE I.—PHENACYL PHENYL METHYLPHOSPHONATES $$X-C_6H_4\overset{O}{\underset{}{C}}-CH_2O-\overset{O}{\underset{CH_3}{P}}-OC_6H_4-Y(p)$$

| Example No. | X | Y | M.P., °C. | Hydrolysis half life in min. at pH 8 and 25° C. | $LD_{50}$ in mice in mg./kg. (i.v.) |
|---|---|---|---|---|---|
| 1 | H | $NO_2$ | 110.5–111 | 2.4 | 14.1 |
| 2 | 4-$OCH_3$ | $NO_2$ | 112–113 | 7.1 | 2.0 |
| 3 | 4-Cl | $NO_2$ | 123–124.5 | 1.2 | 14.9 |
| 4 | 4-$NO_2$ | $NO_2$ | 146–147.5 | 0.2 | 50 |
| 5 | 4-$CH_3$ | $NO_2$ | 112–113 | | |
| 6 | 2-$CH_3$ | $NO_2$ | 88–89.3 | | |
| 7 | 3,5-di-$NO_2$ | $NO_2$ | 127.5–130.5 | | |
| 8 | H | H | 112–125 | 5 | |
| 9 | H | Cl | 108–109 | 4 | |
| 10* | H | $NO_2$ | Too fast to measure (however, see text) | | 1 |

* Oxime derivative of Example No. 1, i.e., phenacyl p-nitropheny methylphosphonate oxime.

The marked acceleration of the rate of hydrolytic destruction of the organophosphonates which form the subject of this invention is evident from an examination of the half lives of these compounds in an aqueous or near-aqueous medium relative to structures which do not contain a properly-positioned anchimeric or neighboring group, including the common insecticides in use today. The pertinent data to support the role of the anchimeric group are shown in Table II. The data shown in A and B were determined in water or 95% water with 5% dioxane or other solvents to render the compounds soluble to provide a homogeneous aqueous system. The data are calculated to pH 8 from a measured second order rate constant involving the reaction of hydroxide ion with the compound. Four representative substituted phenacyl p-nitrophenyl methylphosphonates, taken from Table I and representing the subject of this invention, are shown in part A of Table II. In part B, data are shown for ethyl-p-nitrophenyl methylphosphonate which represents the substitution of a methyl group for the anchimeric carbonyl group in the examples of part A. A comparison of the results for part B vs. part A clearly shows that the anchimeric carbonyl group of the phenacyl moiety reduces the half life by factors ranging from 3000 (where X is methoxy) to 100,000 (where X is p-nitro).

The data of part C of Table II, representing common phosphorus ester insecticides, indicate that the methylphosphonates of part A have half lives which are decreased by at least two orders of magnitude up to many orders of magnitude.

The data of part C of Table II, representing common pound 1 (phenacyl p-nitrophenyl methphosphonate), is striking. In this case, the rate of hydrolysis in water at 25° was studied over the pH range of 2.10 to 2.48 and the rate of hydrolysis for the syn-oxime isomer was 250,000-fold higher than for parent compounds, i.e., Example 1. In the case of anti isomer, the rate of hydrolysis was 2,500-fold higher than the parent compound, but still many million-fold higher than for ethyl p-nitrophenyl phenylphosphonate where no anchimeric assistance is possible. These examples make it abundantly clear that a new and unique structural feature has been introduced into these insecticides while retaining a high degree of toxicity toward insects and other living organisms.

TABLE II

Half Lives in Water at pH 8 and 25°

| Example No. | Structure or name | Approximate half life (hours) |
|---|---|---|
| | A. Some examples of this invention (p-nitrophenyl leaving group only) | |
| 1 | X=H | 0.038 |
| 2 | X=OCH₃ | 0.12 |
| 3 | X=Cl | 0.019 |
| 4 | X=NO₂ | 0.0035 |
| | B. Example with no anchimeric group ethyl p-nitropheny | |
| | Methylphosphonate | 350 |
| | C. Common insecticides (phosphorus esters)[1] | |
| | TEPP | 73 |
| | DFP | 226 |
| | Thiolo-demeton | 14,200 |
| | Paraoxon | 50,200 |
| | Methyl parathion | 203,000 |
| | Parathion | 1,250,000 |

[1] Taken from O'Brien, "Insecticides—Action and Metabolism", Academic Press (1967), p. 37.

While the precise mechanism of the anchimeric, water-mediated destruction of these insecticides is not important to the practice of the invention, it is speculated that the mechanisms of the accelerated reaction may be represented by the following graphical Equation 1:

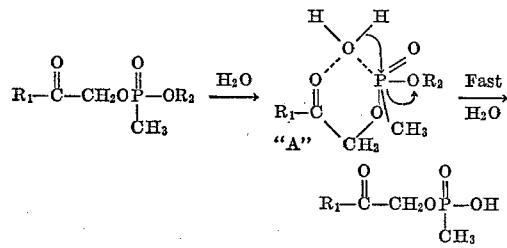

$$R_1-\overset{O}{\overset{\|}{C}}-CH_2O\overset{O}{\overset{\|}{P}}-OH + HOR_2 \quad (1)$$
$$\qquad\qquad\quad |$$
$$\qquad\qquad\;\;CH_3$$

Thus, the structure of organophosphonates of this type permits a molecule of water to be coordinated in the reaction transition state such that a transient, six-member ring may be formed in accordance with accepted principles of physical organic chemistry. Due to the presence of a good leaving group in the molecule, the transition state collapses rapidly to form the products of the reaction, a phosphonic acid and the leaving group phenol. Depending upon the acidity of the aqueous solution and the acidity of the products, the phosphonic acid and the phenol may ionize, all or in part, to form anions.

As shown in Equation 1, the initial products of the fast reaction are the phenacyl methylphosphonic acid and the phenol leaving molecule; both are relatively non-toxic. Further, it is known that the phenacyl methylphosphonic acid is degraded subsequently to a benzoic acid, a methylphosphonic acid and the elements of formaldehyde in alkaline water; the formaldehyde is probably oxidized to formic acid under aerobic conditions.

The presence and position of carbonyl group associated with phenacyl portion of the above structures, i.e.,

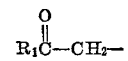

is extremely important and vital to the practice of the present invention. The carbonyl oxygen atom is four atoms removed from the phosphorus atom bearing the leaving group and is positioned to function as an anchimeric or neighboring group to assist, mediated by water, in the removal of the leaving group and elimination of the toxic and insecticidal activity of the compound as described above. The corresponding oxime group functions in the same manner.

The oximino derivative of such carbonyl containing structures is as follows:

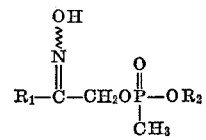

In this case, as already discussed, the process of hydrolysis is accelerated to an even faster rate relative to the parent carbonyl compounds.

Toxicity data for four methylphosphonate esters in mice were listed in Table I. The tests were made on Charles River-Swiss, male-albino mice weighing between 18 and 25 g., with two mice being injected at each dose level. Thus, in spite of their facile hydrolysis in water, the compounds displayed an unexpectedly high degree of toxicity. For comparison, the Merck Index, Eighth Edition (1968), gives the following $LD_{50}$'s for common insecticides: TEPP (tetraethylpyrophosphate), 1.12 mg./kg. (rats, orally); parathion, 5 mg./kg. (orally, rats); malathion, 1.6–4 g./kg. (orally, mice or rats); methyl parathion, 9–25 mg./kg. (orally, rats); and DFP, 0.28 mg./kg. (i.v., monkeys).

Illustrative of the insecticidal activity of the compounds of the present invention is the application to houseflies, a common insect which is difficult to kill. The compounds were applied to the insect in a solution of acetone at a dosage of about 50 micrograms per housefly by applying one microliter of a 50 microgram per microliter solution.

The results are shown in Table III against parathion as a standard.

TABLE III.—TEST DATA ON HOUSEFLIES

| | Percent mortality after— | | |
|---|---|---|---|
| Compound | 2 hr. | 6 hr. | 24 hr. |
| Example: | | | |
| 1 | 10 | 50 | 100 |
| 2 | 30 | 60 | 100 |
| 3 | 30 | 40 | 80 |
| 4 | 20 | 50 | 80 |
| 5 | 0 | 40 | 90 |
| 6 | 10 | 20 | 70 |
| Parathion (O,O-diethyl-O-p-nitrophenylphosphorothioate) | 100 | 100 | 100 |

Mortality was designated by the inability of the insect to maintain or regain an upright position. Ten insects were used per compound.

As can be seen, the compounds of the present invention killed the houseflies to almost the same degree as parathion, although generally longer times were required to achieve mortality. In view of these data, taken together with the mice toxicity data, the methylphosphonate compounds of the invention are predictably broadly useful as insecticides. The killing dosage unit per insect is between about 1 and 500 micrograms per insect.

As can be seen from the foregoing description, the compounds function as insecticides even though they are subject to ready hydrolytic destruction. It is unexpected that these properties would be compatible.

In practice, these products are formulated and applied as dusts, water dispersions, solutions and emulsions. When used in the form of dusts or solid formulations, the active agent content may range from at least about 0.05% to 20% by weight and the balance of the composition comprises an inert solid carrier. Carriers commonly used include gypsum, talc, calcium carbonate, organic flours, bentonites, kaolin, attapulgite and silicon oxides. (See Kirk-Othmer (2d edition), volume 11 pages 677 to 738.)

Wettable powders may be prepared which the active agent in high concentration, i.e., 10% to 95% by weight is blended with a carrier such as attapulgite and 0.5% to 2.0% by weight of a wetting agent so that the formulation can be wetted and suspended properly in water.

The active agent in concentrations ranging from 10% to 50% by weight may be dissolved in water-immiscible organic solvents such as toluene, xylenes, kerosene and oxyhydrocarbons such as ketones and esters; these solutions may be applied by spraying. These formulations may be modified by adding 0.5% to 2.0% by weight of a surface-active agent so that sufficient stable aqueous emulsions are formed suitable for application by spraying.

In the case of formulations involving water, such as wettable powders and emulsives, loss of active agent through hydrolysis may result unless suitable precautions are taken in the formulation to avoid immediate wetting of the agent, and the contact time with water should be minimized.

However, in aqueous systems, the products are remarkably stabilized by reducing the pH of the system, as by adding acetic acid, for example. Thus, the half-life of phenacyl phenyl methylphosphonate varies with pH at 25° C. as follows: 8.10, 4.0 minutes; 7.50, 13 minutes and 4.54, 311 minutes; at pH 3.54, there was no observable hydrolysis in 5 hours. Thus, pH control permits aqueous systems of variable stability to be prepared.

On the other hand, the increased rate of hydrolytic destruction with increasing pH is extremely important in the formulation of decontaminating solutions to destroy the insecticides after their function has been fulfilled. Thus, ready destruction of the insecticides can be achieved by spraying surfaces covered with the insecticide with aqueous decontaminating solutions of moderately elevated pH. The example cited in the preceding paragraph illustrates clearly that the half-life of phenacyl phenyl methylphosphonate, for example, is reduced from 13 minutes at pH 7.50 to 4 minutes at 8.18. Thus, aqueous solutions containing a mild alkali, such as sodium bicarbonate or sodium carbonate, will rapidly and effectively destroy the insecticides. It is further obvious to those skilled in the art that such decontaminating solutions can be made significantly more effective by adding suitable surface-active agents to increase the wettability of the insecticide by the decontaminating solution. Many household detergents, in fact, form solutions which are mildly alkaline, i.e., a pH of 9 or higher, and these will be effective also to destroy rapidly the insecticides.

METHODS OF SYNTHESIS

The methylphosphonate diesters may be prepared in various ways. One general method (Equation 2) involved the coupling of benzoyldiazomethanes with phenyl methylphosphonic acids.

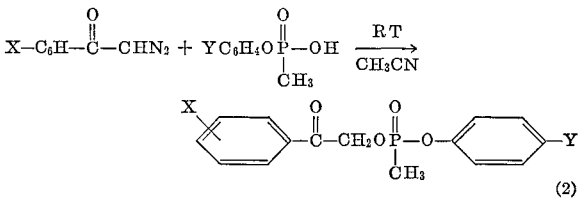

(2)

The diazoketones, all previously reported, were prepared by the general method of F. Arndt and J. Amende, Chem. Ber., 61, 1122 (1948). A slight excess of the diazoketone and the appropriate phenyl methylphosphonic acid were dissolved in dry acetonitrile or acetone and allowed to stand overnight at room temperature before workup; in the following, a general procedure for this general reaction will be presented and the individual details of the workup, isolation, purification and identification will be listed for each compound prepared in this manner. All melting points listed herein are uncorrected.

Benzoyldiazomethane was prepared in 71% yield by the standard procedure, M.P. 46–48° (lit. 49°) from hexane. Decomposition in the melting point tube began at 140°. p-Chlorobenzoyldiazomethane was prepared in 60% yield, M.P. 114.5–116°, from benzene/petroleum ether (lit. 113–114.5°). p-Methoxybenzoyldiazomethane was prepared in 63% yield by the standard procedure, M.P. 89–90° from benzene/petroleum ether (lit. 90–91°). p-Nitrobenzoyldiazomethane was prepared in 80% yield by the standard procedure, M.P. 115–117.5° dec., from benzene/petroleum ether (lit. 116–117°). The procedure was modified by using a reaction temperature of −20° although this may not be necessary. 4-methylbenzoyldiazomethane was prepared by the procedure of Wilds and Meader in 48% yield, M.P. 51.5–53° (lit. 48–51°), single spot on TLC. 2-methylbenzoyldiazomethane was prepared by the standard procedure to yield an oil which was carefully distilled, B.P. 47.5–51.5°/0.08 mm., in 43% yield.

*Analysis.*—Calcd. for $C_9H_8N_2O$ (percent): C, 67.49; H, 5.03; N, 17.52. Found (percent): C, 67.52; H, 5.18; N, 16.81.

A second run was made in which the oil, without distillation, was crystallized from ether-petroleum ether to give yellow needles, M.P. ca. 19–22°, in 60% yield. 3,5-dinitrobenzoyldiazomethane was prepared by the standard procedure in 50% yield, M.P. 108–109.5. Recrystallization from hot methanol gave M.P. 109.5–110.5° (lit. 106° Dec.).

*Analysis.*—Calcd. for $C_8H_4N_4O_5$ (percent): C, 41.02; H, 1.71. Found (percent): C, 41.14; H, 1.79.

The general procedure for utilizing the method of Equation 1 for the preparation of the various phenacyl p-nitrophenyl methylphosphonates involved preparing a solution of equimolar quantities of the benzoyldiazomethane and the phenyl methylphosphonic acid in dry acetonitrile or dry acetone at room temperature. Anhydrous conditions are mandatory. The solution was warmed slightly, if required, to dissolve the reactants and/or to initiate nitrogen evolution. After standing overnight, the solvent was removed and the residue was recrystallized from a suitable solvent. As stated, this general procedure was used for most of the compounds so that only the details following the workup will be presented in the experimental work described in the various examples presented below.

A second procedure, which was used in several instances, involves the coupling of silver salts of substituted phenyl methylphosphonic acids and substituted phenacyl halides in suitable solvents such as acetonitrile.

After the reaction is completed, the precipitated silver halide was filtered and the diester, a phenacyl p-nitrophenyl methylphosphonate, was isolated by removing the solvent and then purified by suitable means. Alternatively, sodium salts have been used successfully in solvent systems in which the sodium halide salt is insoluble.

A third procedure which has also been employed successfully involves coupling of a mole of phenacyl alcohol with a mole of phenyl methylphosphonochloridate in the presence of a tertiary amine.

A fourth procedure involves coupling of a phenacyl alcohol with a phenyl methylphosphonic acid in the presence of a water acceptor such as dicyclohexyl carbodiimide (DCC).

Example 1

Phenacyl p - nitrophenyl methylphosphonate.—The crude product, obtained by the diazoketone-phosphonic acid general procedure was triturated with dry petroleum ether/ethyl ether (80/20 v./v.) and recrystallized ($\times$3) from toluene/dioxane/petroleum ether to give a white powder (45%), M.P. 110.5–111°.

Analysis.—Calcd. for $C_{15}H_{14}O_6NP$ (percent): C, 53.74; H, 4.21; N, 4.18; P, 9.24. Found (percent): C, 53.67; H, 4.49; N, 4.04; P, 9.10

The above compound was prepared also in good yield by adding phenacyl alcohol (one mole) in dry benzene over 30 min. to a stirred solution of p-nitrophenyl methylphosphonochloridate (2 moles) and dry pyridine (4 moles) in benzene at 5–10° C. After stirring at room temperature for 4 days, the reaction mixture was filtered to remove pyridine hydrochloride. The filtrate was extracted with aqueous 5% hydrochloric acid and then with 0.1 M phosphate buffer at pH 7.0. The solution was dried and the benzene was removed in vacuo to give a 67% yield of crude product. The crude product was recrystallized from acetone/cyclohexane to give a white crystalline solid, M.P. 112–114° C.

Example 2

4 - methoxyphenacyl p-nitrophenyl methylphosphonate.—The crude product, a gummy brown solid, from the standard procedure, was triturated twice with acetone/petroleum ether. The resulting solid was recrystallized three times from benzene/petroleum ether and twice from methyl ethyl ketone/petroleum ether to give 47% of product, M.P. 112–113° C.

Analysis.—Calcd. for $C_{16}H_{16}NO_7P$ (percent): C, 52.61; H, 4.42; N, 3.82; P, 8.48. Found (percent): C, 52.85; H, 4.54; N, 4.14; P, 8.36.

Example 3

4-chlorophenacyl p-nitrophenyl methylphosphonate.—The crude product from the general procedure was recrystallized ($\times$3) from benzene/petroleum ether and twice from methyl ethyl ketone/petroleum ether to give 57% of product, M.P. 123–124.5°.

Analysis.—Calcd. for $C_{15}H_{13}ClNO_6P$ (percent): C, 48.73; H, 3.54; Cl, 9.59; N, 3.79; P, 8.38. Found (percent): C, 48.87; H, 3.81; Cl, 9.69; N, 3.97; P, 8.56.

The same product was also obtained in 40% yield by reacting silver p-nitrophenyl methylphosphonate with p-chlorophenacyl chloride in acetonitrile solvent. Silver chloride was removed by filtration and the product was isolated by removal of solvent and recrystallization of the crude product was described above.

Example 4

4-nitrophenacyl p-nitrophenyl methylphosphonate.—The crude product crystallized with red colored impurities. The solvent was removed by pipette and the crystals were washed with diethyl ether. The resulting solid was recrystallized ($\times$3) from diethyl ether/petroleum ether to give light-yellow crystals (53%), M.P. 146–147.5°.

Analysis.—Calcd. for $C_{15}H_{13}N_2O_8P$ (percent): C, 47.38; H, 3.45; N, 7.37. Found (percent): C, 47.34; H, 3.40; N, 7.33.

Example 5

4-methylphenacyl p-nitrophenyl methylphosphonate.—In this case, after mixing the reactants, the solution started to turn brown (20 min.), so the solvent was largely removed under reduced pressure. Petroleum ether (30–60°) was added and the mixture was allowed to stand overnight. The mixture was concentrated and recrystallized ($\times$2) from methyl ethyl ketone/petroleum ether and once from benzene/petroleum ether to give product (43%), M.P. 112–113°.

Analysis.—Calcd. for $C_{16}H_{16}NO_6P$ (percent): C, 55.02; H, 4.62; N, 4.01; P, 8.87. Found (percent): C, 55.23; H, 4.30; N, 4.20; P, 8.68.

Example 6

2-methylphenacyl p-nitrophenyl methylphosphonate.—The crude gummy brown residue was triturated ($\times$2) with acetone/petroleum ether. The resulting solid was recrystallized ($\times$3) from benzene/petroleum ether and twice from methyl ethyl ketone/petroleum ether to give 47% of product, M.P. 112.5–114°.

Analysis.—Calcd. for $C_{16}H_{16}NO_7P$ (percent): C, 52.61; H, 4.62; N, 3.83; P, 8.48. Found (percent), C, 52.85; H, 4.54; N, 4.14; P, 8.36.

Example 7

3,5 - dinitrophenacyl p-nitrophenyl methylphosphonate.—The crude solid was dissolved in warm acetonitrile, carefully filtered and allowed to cool. Two such recrystallizations gave light yellow, feathery crystals (34%), M.P. 127.5–130.5°.

Analysis.—Calcd. for $C_{15}H_{12}N_3O_{10}P$ (percent): C, 42.38; H, 2.83; N, 9.88; P, 7.28. Found (percent): C, 42.62; H, 2.90; N, 9.88; P, 6.99.

Example 8

Phenacyl phenyl methylphosphonate.—The crude product, an oil, was dissolved in benzene and the solution was quickly washed with cold water, followed by drying ($Na_2SO_4$). The solution was distilled and the product, a clear yellow viscous oil (57%), was collected at 115–125°/0.005 mm. Hg.

Analysis.—Calcd. for $C_{15}H_{15}O_4P$ (percent): C, 62.07; H, 5.20; P, 10.67. Found (percent): C, 61.79; H, 5.31; P, 10.45.

The compound of this example was obtained in essentially the same yield (55%) by coupling silver phenyl methylphosphonate with phenacyl bromide as described for compound of Example 3 above and the compound of Example 10 below.

Example 9

Phenacyl p-chlorophenyl methylphosphonate. — The crude orange product was recrystallized from benzene/petroleum ether. The white crystalline solid was filtered and washed with a little petroleum ether/diethyl ether. The product (43%) had M.P. 108–109°.

Analysis.—Calcd. for $C_{15}H_{14}ClO_4P$ (percent): C, 55.18; H, 4.35; Cl, 10.92. Found (percent): C, 55.47; H, 4.33; Cl, 10.67.

Example 10

Phenacyl p-nitrophenyl methylphosphonate oxime.—p-Nitrophenyl methylphosphonic acid (2.17 g., 10 mmole) was dissolved in a minimum amount of cold distilled water and the solution was treated with powdered silver carbonate (1.88 g., 6.8 mmole) and the precipitate was washed with hot water. The filtrate was lyophilized and the resulting residue was washed with cold chloroform to provide 3.2 g. (quantitative) of silver p-nitrophenyl methylphosphonate, M.P. 207–209°. Recrystallization from a mixture of anhydrous methanol and anhydrous diethyl ether gave white plates, M.P. 208–210°.

*Analysis.*—Calcd. for $C_7H_7AgNO_5P$ (percent): C, 25.95; H, 2.17; P, 9.56. Found (percent): C, 25.87; H, 2.27; P, 9.37.

Phenacyl bromide was dissolved in a minimum amount of methanol and treated with an aqueous solution of one equivalent of hydroxylamine sulfate. The suspension was stirred one day at room temperature and the methanol was evaporated under reduced pressure. The residue was extracted with benzene and the extract was dried ($Na_2SO_4$). Benzene was removed and the residue was recrystallized from chloroform/petroleum ether without heating. The yield was 60% (by reworking the mother liquor) of phenacyl bromide oxime, M.P. 97–98.5°.

*Analysis.*—Calcd. for Br, 37.33%. Found: 37.20%.

A solution of phenacyl bromide oxime (432 mg., 2 mmole) in 10 ml. of anhydrous acetonitrile was added to a solution of silver p-nitrophenyl methylphosphonate (649 mg., 2 mmole) in 240 ml. of acetonitrile. The reaction mixture was stirred for 2.5 hrs. and filtered. The oily residue obtained by evaporation of the filtrate was dissolved in methylene chloride and the solution was filtered to remove traces of silver bromide. Removal of the solvent and crystallization of the residue from a mixture of methylene chloride and petroleum ether (30–60°) without heating (×2) gave 420 mg., 60%, of the oxime of phenacyl p-nitrophenyl methylphosphonate, M.P. 115–117°. The NMR spectra ($CDCl_3$) was as follows: δ 5.02 (d, 2H, J=9.5 Hz., $POCH_2$), δ 1.65 (d, 3H, J=18 Hz., P—$CH_3$).

*Analysis.*—Calcd. for $C_{15}H_{15}N_2O_6P$ (percent): C, 51.43; H, 4.31; N, 7.99. Found (percent): C, 51.36; H, 4.28; N, 8.15.

Based on the NMR data, this product is the anti isomer (syn phenyl), that is the isomer in which the phenyl group and the hydroxyl group attached to the nitrogen atom are cis to each other.

A homogeneous reaction system is not required. Thus, phenacyl bromide oxime (1.0 g.) and the silver salt (1.12 g.) were suspended in acetonitrile (75 ml.) and refluxed for 18 hrs. Yields ranged from 43–53%.

To isomerize the above p-nitrophenylphenacyl methylphosphonate oxime (anti to syn), the above anti oxime was dissolved in glacial acetic acid at room temperature. After one hour, the mixture contained 75% to 80% of the syn isomer and products of this composition were isolated in about 80% yield. The composition of the mixture was established by NMR spectral determinations and by solvolysis kinetic studies in near-aqueous systems. The syn isomer hydrolyzes some 120-hold faster than the anti isomer and kinetic measurements provide another way of determining the relative proportions of the syn and anti isomers in a mixture.

Using the procedures of the above Examples 1 to 10, other compounds of the present invention can be prepared. Also one skilled in the art will recognize that such other compounds are active insecticides.

We claim:

1. A method for killing insects which comprises contacting the insects with an enzyme deactivating insecticidal amount of the methylphosphonate ester of the formula:

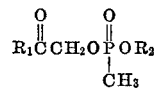

wherein $R_1$ is unsubstituted phenyl or phenyl substituted with a member selected from the group consisting of methoxy, chloro, nitro, dinitro and methyl and $R_2$ is unsubstituted phenyl or phenyl substituted in the para position with a member selected from the group consisting of nitro and halo.

2. The method of claim 1 wherein the insects are contacted with between about 1 and 500 micrograms of the ester per insect.

3. The method of claim 1 wherein the ester is employed in a composition containing between about 0.05 and 20 percent by weight of the ester and the balance being an inert solid carrier material.

References Cited

UNITED STATES PATENTS

| | | | |
|---|---|---|---|
| 3,014,949 | 12/1961 | Birum et al. | 260—946 X |
| 3,014,953 | 12/1961 | Birum et al. | 260—946 X |

OTHER REFERENCES

J. Agr. Food Chemistry 172, 255–8 (1969).

J. Am. Chem. Soc. 881, 188–9 (1966).

ALBERT T. MEYERS, Primary Examiner

L. SCHENKMAN, Assistant Examiner